United States Patent Office 3,321,200
Patented May 23, 1967

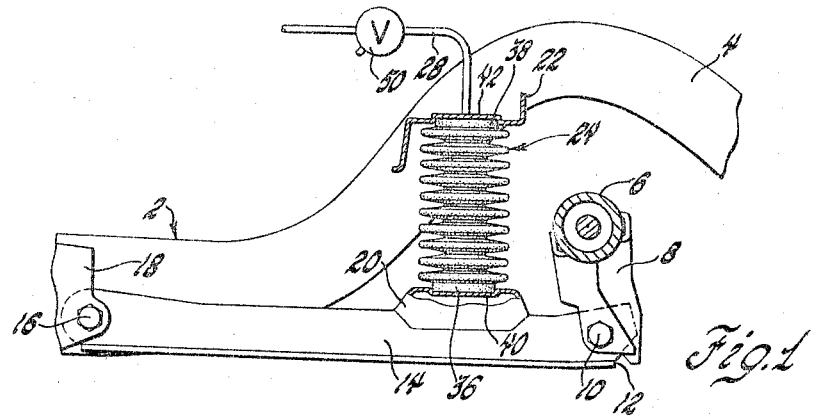
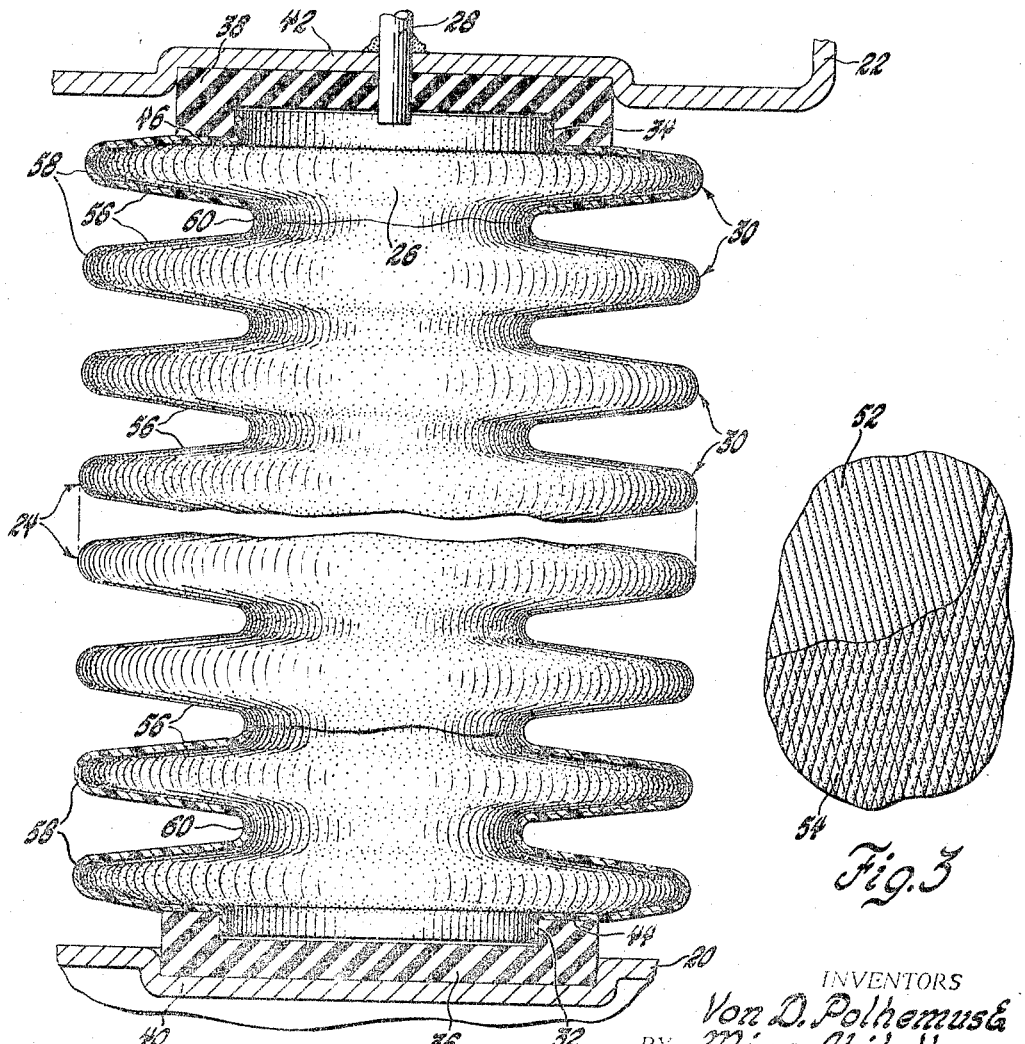

3,321,200
REINFORCED PLASTIC BELLOWS SPRING
Von D. Polhemus, Pontiac, and Ming-Chih Yew, Utica, Mich., assignors to General Motors Corporation, Detroit, Mich., a corporation of Delaware
Filed Jan. 13, 1965, Ser. No. 425,182
8 Claims. (Cl. 267—65)

This invention relates to spring constructions and more particularly to bellows springs formed of reinforced plastic material having deformation characteristics providing a constant spring rate while forming a cavity adapted to receive air under pressure to augment the constant spring rate upon imposition of increased load.

An object of the present invention is to provide an improved spring construction.

Another object is to provide an improved bellows type spring.

A further object is to provide a bellows type spring adapted for spring rate augmentation by introduction of air into the interior thereof wherein the spring is formed of material capable of sustaining the principal load in the absence of air pressure augmentation.

Still another object is to provide a spring of the type described formed of plastic material reinforced with multifilament glass fibers or strands which are directionally oriented in the plastic material so as to experience bending deflection during compression and expansion of the bellows.

Yet another object is to achieve a bellows construction wherein the individual filaments of the glass fibers provide a linear succession of cantilever spring portions.

These and other objects, advantages and features of the invention will become more fully apparent as reference is had to the accompanying specification and drawings wherein:

FIGURE 1 is a fragmentary side elevational view, partly in section, of a vehicle suspension construction utilizing the present invention;

FIGURE 2 is an enlarged sectional elevational view of the spring construction shown in FIGURE 1; and FIGURE 3 is an enlarged fragmentary view of a wall section of the spring illustrating a preferred orientation of glass strands prior to forming of radial convolutions.

Referring now to the drawings and particularly FIGURE 1, reference numeral 2 generally designates a vehicle frame which includes a rearwardly extending upwardly arched kick-up portion 4 overlying a transversely extending axle housing 6. Housing 6 is formed with a depending bracket member 8 which is pivotally connected at 10 to the rearward extremity 12 of a suspension control arm 14. The forward end of control arm 14, in turn, is pivotally mounted at 16 on an outrigger bracket 18 supported on frame 2. Intermediate its opposite ends, arm 14 is formed with a lower spring seat 20 located in general vertical alignment with an upper spring seat 22 attached to kick-up portion 4. Disposed in compression between seats 20 and 22 is a bellows type spring 24 having air impermeable wall structure of approximately uniform thickness defining an internal chamber 26 which is subject to variable air pressure by means of an air conduit 28.

In accordance with the present invention, as seen best in FIGURE 2, bellows 24 is in the form of a molded generally cylindrical reinforced plastic body preformed to provide a plurality of axially spaced radially extending circumferential convolutions 30 and terminates at its opposite ends in cylindrical pilot portions 32 and 34. Surroundingly embracing pilot portions 32 and 34 are a pair of generally cup-shaped elastomeric closure members 36 and 38 which are seated respectively in depressed portions 40 and 42 of spring seats 20 and 22. Closures 36 and 38 are preferably formed to provide gripping circumferential engagement with the side walls of pilot portions 32 and 34 and abutting contact with the adjacent top surfaces 44 and 46 of the terminal convolutions. Projecting centrally through upper closure 38 is the terminal end of conduit 28 through which air under pressure from a source of supply, not shown, is introduced into the chamber 26 of bellows 24 in accordance with manipulation of a valve 50 interposed in conduit 28.

According to the principal feature of the invention, the bellows structure 24 is formed of multifilament glass fiber reinforced plastic material such as polyepoxide resin which, in addition to providing an air impermeable wall surrounding the chamber 26, also exhibits elastic deformation characteristics providing a constant spring rate capable of supporting the sprung portion of the vehicle when the latter is at curb weight. As a result, the spring not only enables utilization of air under pressure to vary the load supporting capability thereof, but also offers the additional advantage of being fail safe if the bellows structure were to become punctured or the interior thereof in any other way were subjected to loss of pressure, in which case the load supporting capability would merely diminish to that provided by the structural resilience of the bellows alone.

In accomplishing the objectives of the invention, it has been determined that optimum deflection characteristics are obtained by orienting the multifilament glass fibers or strands within the plastic matrix so that each filament is subjected to essentially bending deflection during compression and expansion of the bellows along its effective central vertical axis. Thus, the individual filaments may be distributed around the circumference of the bellows and aligned in parallel relation to the central vertical axis. However, in order to achieve a high level of lateral stability as well as optimum deflection characteristics, it is preferable that the filaments be molded in the plastic matrix in parallel groups of fibers 52 and 54 arranged in criss-cross fashion as shown in FIGURE 3, with the fibers of each group defining an angle of not more than 15° from the vertical. In practice, the fibers are distributed in the fashion described in a plastic matrix of cylindrical form which is then introduced into a suitable mold in which the cylindrical wall is radially deformed to produce the multiple convolution cross section and final curing of the plastic material is accomplished. After final curing, each individual filament in the bellows structure defines a serpentine path providing a succession of radially extending straight portions 56 connected by alternating radius portions 58 and 60 at the inner and outer extremities of each convolution. Hence, upon compression and expansion of the bellows, each straight portion 56 functions as a cantilever spring anchored at the prestressed inner and outer radii 58 and 60.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:

1. A compression spring comprising a bellows structure formed of glass fiber reinforced plastic, said glass fibers being oriented in said plastic so as to exhibit essentially bending deflection during compression and expansion of said bellows.

2. A glass fiber reinforced plastic spring comprising a laterally stable axially deformable generally cylindrical hollow body formed with a plurality of axially spaced radially extending convolutions.

3. A glass fiber reinforced plastic spring comprising an air impermeable laterally stable axially deformable generally cylindrical hollow body formed with at least one radially extending circumferential convolution.

4. A composite spring comprising, an air impermeable glass fiber reinforced laterally stable axially deformable generally cylindrical hollow plastic bellows providing a primary constant spring rate resulting entirely from axial deformation, closure means engaging opposite ends of said bellows, and means for introducing air under pressure into the interior of said bellows to provide a secondary variable spring rate.

5. In a vehicle suspension, a composite spring comprising, an air impermeable glass fiber reinforced laterally stable axially deformable generally cylindrical hollow body formed with a plurality of axially spaced radially extending convolutions, cylindrical pilot portions formed at opposite ends of said body, closure means engaging said pilot portions, and means projecting through one of said closure means enabling flow of superatmospheric air into and out of the interior of said body, said last mentioned means including valve means for regulating said flow, said hollow body having elastic deformation characteristics providing a constant spring rate capable of supporting the sprung portion of the vehicle when the latter is at curb weight.

6. In a vehicle suspension, a composite spring comprising, an air impermeable axially deformable generally cylindrical hollow reinforced plastic body formed with a plurality of axially spaced radially outwardly extending convolutions, cylindrical pilot portions formed at opposite ends of said body, generally cup-shaped flexible closure means engaging said pilot portions, and means projecting through one of said closure means enabling flow of superatmospheric air into and out of the interior of said body, said last mentioned means including valve means for regulating said flow, said hollow body having elastic deformation characteristics providing a constant spring rate capable of supporting the sprung portion of the vehicle when the latter is at curb weight.

7. In a vehicle suspension, a composite spring comprising, an air impermeable glass fiber reinforced laterally stable axially deformable generally cylindrical hollow plastic body formed with a plurality of axially spaced radially outwardly extending convolutions, cylindrical pilot portions formed at opposite ends of said body, generally cup-shaped flexible closure means engaging said pilot portions, and means projecting through one of said closure means enabling flow of superatmospheric air into and out of the interior of said body, said last mentioned means including valve means for regulating said flow, said hollow body having elastic deformation characteristics providing a constant spring rate capable of supporting the sprung portion of the vehicle when the latter is at curb weight.

8. In a motor vehicle, a sprung portion, an unsprung portion, a link member pivotally connected at its opposite ends to said sprung and unsprung portions respectively, an air impermeable bellows type glass fiber reinforced plastic constant rate spring disposed between said lever member and said sprung mass having elastic deformation characteristics providing a constant spring rate capable of supporting the sprung portion of the vehicle when the latter is at curb weight, and means for introducing air under pressure into the interior of said spring to provide variable rate augmentation to said constant rate spring.

References Cited by the Examiner

UNITED STATES PATENTS

| | | | |
|---|---|---|---|
| 2,686,006 | 8/1954 | Hasselquist | 92—47 |
| 2,755,643 | 7/1956 | Wildhaber | 92—47 |
| 2,955,814 | 10/1960 | Locklin | 267—65 |
| 2,973,955 | 3/1961 | Brief | 267—65 |
| 3,013,920 | 12/1961 | Harris et al. | 92—103 X |
| 3,030,252 | 4/1962 | Edgerly et al. | 92—103 X |

FOREIGN PATENTS 213,298   2/1958   Australia.

ARTHUR L. LA POINT, *Primary Examiner.*

R. M. WOHLFARTH, *Assistant Examiner.*